No. 625,720. Patented May 23, 1899.
E. DAVIS.
BICYCLE, &c.
(Application filed Feb. 4, 1898.)
(No Model.) 2 Sheets—Sheet 1.
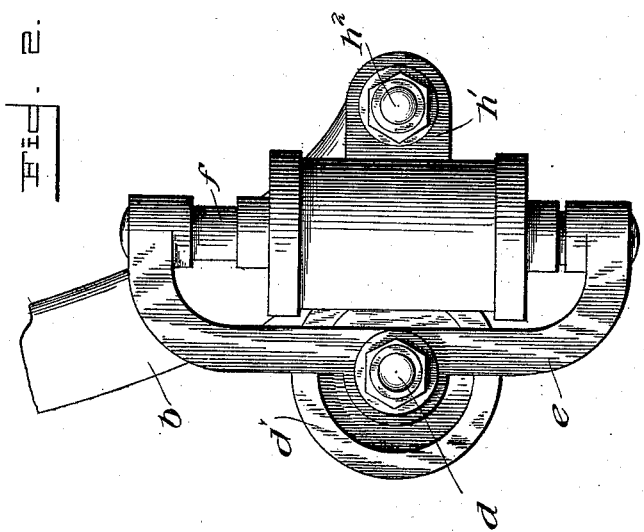
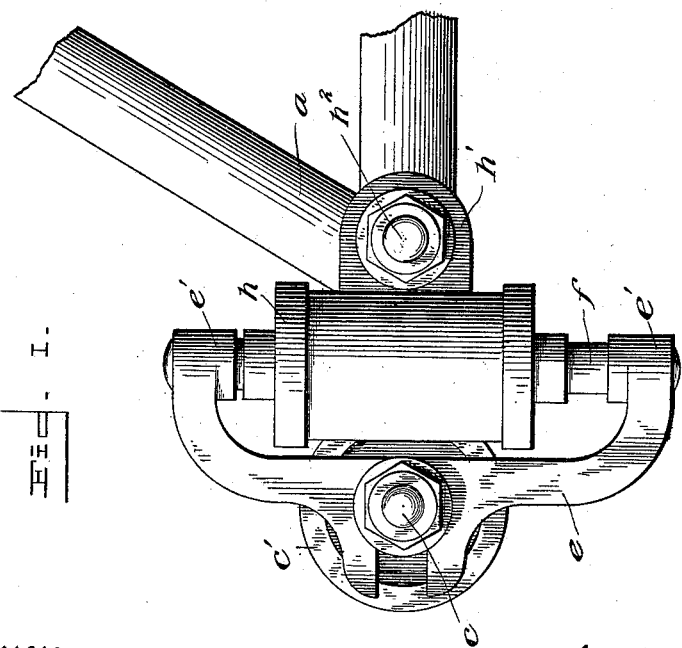
Witnesses:
Fenton S. Belt,
H. Joseph Doyle.
Inventor:
Edward Davis
by Wright, Brown & Quinby
Attorneys.

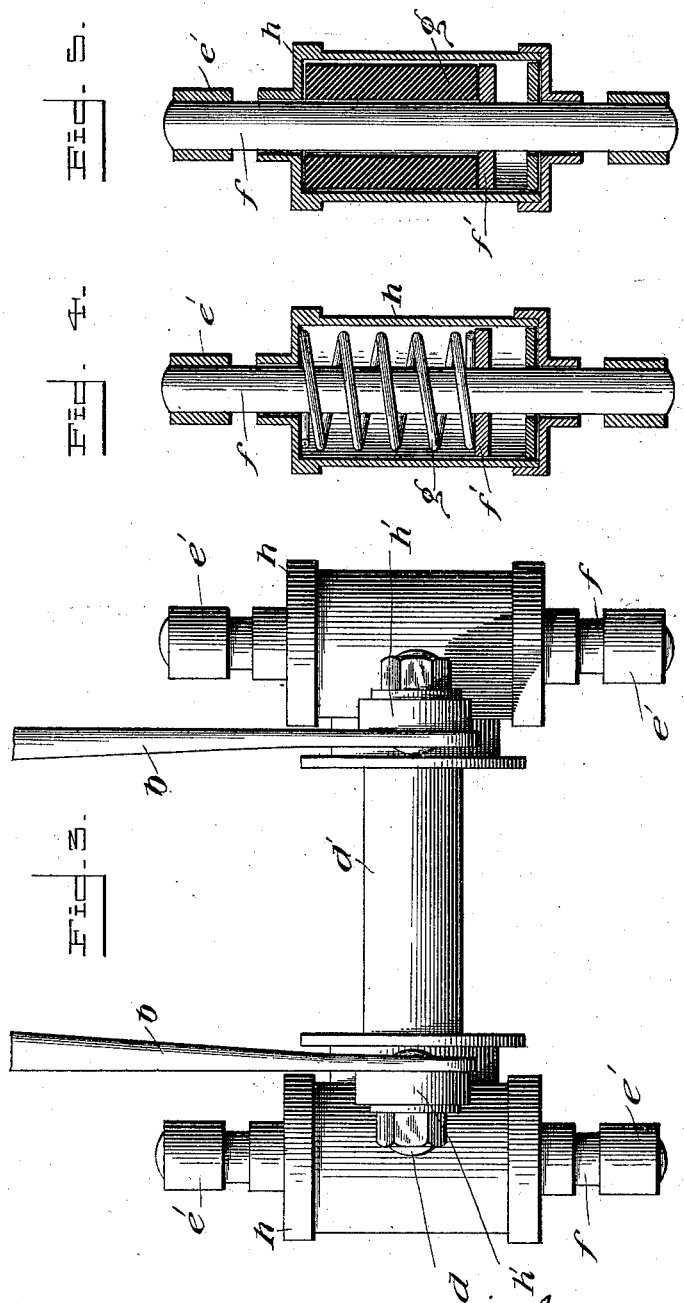

UNITED STATES PATENT OFFICE.

EDWARD DAVIS, OF BOSTON, MASSACHUSETTS, ASSIGNOR, BY DIRECT AND MESNE ASSIGNMENTS, TO CHARLES F. BROWN, TRUSTEE, OF READING, MASSACHUSETTS.

BICYCLE, &c.

SPECIFICATION forming part of Letters Patent No. 625,720, dated May 23, 1899.

Application filed February 4, 1898. Serial No. 669,098. (No model.)

*To all whom it may concern:*

Be it known that I, EDWARD DAVIS, of Boston, in the county of Suffolk and State of Massachusetts, have invented certain new and useful Improvements in Bicycles, &c., of which the following is a specification.

This invention relates to bicycles or other like vehicles, and has for its object to provide improved means for yieldingly supporting the frame or body of the vehicle on the axles thereof.

The invention consists in the improvements which I will now proceed to describe and claim.

Of the accompanying drawings, forming a part of this specification, Figure 1 represents a side elevation of the rear portion of the frame of a bicycle, showing the axle and hub of the rear wheel and connecting devices between the frame and axle embodying my invention. Fig. 2 represents a similar view showing a portion of the front fork, the front axle and its hub, and the said connecting mechanism. Fig. 3 represents a front view showing the construction represented in Fig. 2. Figs. 4 and 5 represent sectional views hereinafter referred to.

The same letters of reference indicate the same parts in all the figures.

In the drawings, $a$ represents the rear portion of the frame of a bicycle, and $bb$ represent portions of the steering-fork.

$c$ represents the axle of the rear wheel, and $c'$ the hub thereof, while $d$ represents the axle of the front wheel, and $d'$ its hub. To the ends of the axles $c$ and $d$ are affixed yokes or brackets $e\ e$, each of which has at its ends sockets or holders $e'\ e'$. To said holders and extending vertically across the space between them is affixed a vertical rod or guide $f$, preferably cylindrical in form. To each rod or guide is affixed a head or disk $f'$, the function of which is to support a spring $g$, which may be of any suitable form, such as the helical form shown in Fig. 4 or the annular form shown in Fig. 5, the latter representing a rubber spring.

$h\ h$ represent spring housings or casings affixed to the frame $a$ and fork $b$, said housings being formed to bear upon the upper ends of the springs $g$, as shown in Figs. 4 and 5, and to inclose and cover said springs, the housings being also movable vertically upon the guides $ff$ between the sockets or holders $e'\ e'$, the latter limiting the vertical movements of the housings. The housings may be attached to the frame and to the fork $b$ in any suitable way. I have here shown the housings provided with ears $h'$, which are cast upon or otherwise rigidly attached to the housings and are secured by bolts $h^2$ to the frame $a$ and fork $b$.

It will be seen that the rods or guides $f$, rigidly connected with the axles, constitute unyielding supports for the springs $g$ and that said springs, interposed between the disks or bearings $f'$ on the guides $f$ and the housings $h$, yieldingly support the frame or body of the vehicle. I have found by practical tests that the yielding support thus obtained is sufficient to enable me to dispense with pneumatic tires and that a bicycle equipped with my improvement and having rigid tires is as easy to the rider as one equipped with pneumatic tires. I prefer, however, in order to avoid noise, to use solid-rubber tires.

It will be seen that my improved construction above described is simple and compact and that the springs are closely incased and protected.

I claim—

1. A bicycle or other vehicle comprising a frame or body portion, an axle, yokes $e$ secured to the ends of the axle, each of said yokes having sockets or holders $e'\ e'$ and a rod or guide $f$ having its ends secured in said sockets or holders and provided with a head or disk $f'$, casings $h\ h$ affixed to the frame and inclosing the disks $f'$ and adapted to slide on the rods $f$, and springs inclosed in the casings and confined between the disks $f'$ and the upper ends of the casings.

2. A bicycle or other vehicle comprising a frame or body portion, an axle, yokes $e$ secured to the ends of the axle, each of said yokes having sockets or holders $e'$ $e'$ and a vertical rod or guide $f$ having its ends secured in said sockets or holders and provided with a head or disk $f'$, casings $h$ $h$ having ears $h'$ secured to the frame and movable on the rods $f$ between the sockets $e'$ of the yokes and inclosing the disks $f'$, and springs confined in the casings between the disks $f'$ and the upper ends of the casings.

In testimony whereof I have affixed my signature in presence of two witnesses.

EDWARD DAVIS.

Witnesses:
 C. F. BROWN,
 A. D. HARRISON.